United States Patent
Hosono et al.

(10) Patent No.: US 9,124,739 B2
(45) Date of Patent: Sep. 1, 2015

(54) IMAGE FORMING APPARATUS, PAGE IMAGE DISPLAYING DEVICE, AND DISPLAY PROCESSING METHOD

(71) Applicant: Konica Minolta, Inc., Tokyo (JP)

(72) Inventors: Masao Hosono, Aichi (JP); Kaoru Fukuoka, Hyogo (JP); Hiroki Ueda, Aichi (JP); Tomoyuki Atsumi, Aichi (JP); Takashi Oikawa, Aichi (JP); Tatsuya Kitaguchi, Aichi (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/221,947

(22) Filed: Mar. 21, 2014

(65) Prior Publication Data
US 2014/0285850 A1    Sep. 25, 2014

(30) Foreign Application Priority Data
Mar. 25, 2013    (JP) .................. 2013-061335

(51) Int. Cl.
G06K 15/02    (2006.01)
G06K 15/00    (2006.01)
H04N 1/00    (2006.01)

(52) U.S. Cl.
CPC ....... *H04N 1/00392* (2013.01); *H04N 1/00381* (2013.01); *H04N 1/00411* (2013.01); *H04N 1/00458* (2013.01); *H04N 1/00469* (2013.01); *H04N 1/00482* (2013.01)

(58) Field of Classification Search
CPC .......... H04N 1/00381; H04N 1/00392; H04N 1/00411; H04N 1/00458; H04N 1/00469; H04N 1/00482
USPC .................................. 358/1.1–1.9, 1.11–1.18
See application file for complete search history.

(56) References Cited

U.S. PATENT DOCUMENTS

| | | |
|---|---|---|
| 5,666,208 A | 9/1997 | Farrell et al. |
| 2007/0063037 A1* | 3/2007 | Silverbrook et al. ......... 235/432 |
| 2008/0151300 A1 | 6/2008 | Kowaka et al. |
| 2009/0010566 A1 | 1/2009 | Meijers |
| 2011/0310405 A1* | 12/2011 | Kraguljac ..................... 358/1.6 |
| 2012/0179967 A1 | 7/2012 | Hayes |

(Continued)

FOREIGN PATENT DOCUMENTS

| | | |
|---|---|---|
| EP | 2012523 A1 | 1/2009 |
| JP | H03-174587 A | 7/1991 |

(Continued)

OTHER PUBLICATIONS

Patent Abstracts of Japan, Publication No. JP2012-123066 dated Jun. 28, 2012 (1 page).

(Continued)

*Primary Examiner* — King Poon
*Assistant Examiner* — Ibrahim Siddo
(74) *Attorney, Agent, or Firm* — Osha Liang LLP

(57) ABSTRACT

A page image displaying device includes a display control portion configured to keep displaying, when a designated region is set, and when a touch-sensitive panel detects a touch action of giving a command to changes pages to be displayed from one to another, a page image of a first page in a region other than the designated region of a page display region in which the page image is displayed, and, to change partly what is displayed in the page display region in a manner to display a part of a page image of a second page of the document in the designated region, said part corresponding to a part in position in the designated region of the page image of the first page.

27 Claims, 17 Drawing Sheets

(56) References Cited

U.S. PATENT DOCUMENTS

| 2012/0179970 | A1 | 7/2012 | Hayes |
| 2012/0218203 | A1 | 8/2012 | Kanki |
| 2012/0223897 | A1* | 9/2012 | Hamada ........................ 345/173 |
| 2013/0061163 | A1* | 3/2013 | Clark et al. ................... 715/771 |
| 2014/0053066 | A1* | 2/2014 | Imamura ....................... 715/251 |

FOREIGN PATENT DOCUMENTS

| JP | H10-198700 A | 7/1998 |
| JP | 2010-204891 A | 9/2010 |
| JP | 2012-088804 A | 5/2012 |
| JP | 2012-123066 A | 6/2012 |
| JP | 2012-168620 A | 9/2012 |
| WO | 2012/094479 A1 | 7/2012 |

OTHER PUBLICATIONS

Office Action issued in counterpart Japanese Patent Application No. 2013-061335 dated Jan. 27, 2015 (7 pages).

Extended European Search Report issued in counterpart European Patent Application No. 14160888.5 dated Nov. 21, 2014 (7 pages).

* cited by examiner (A)

(B) (C) (D)

FLICK/DRAG TO THE LEFT    FLICK/DRAG TO THE LEFT (E) (F) (G)

FLICK/DRAG TO THE LEFT (A)

(B)

(C)

IMAGE FORMING APPARATUS, PAGE IMAGE DISPLAYING DEVICE, AND DISPLAY PROCESSING METHOD

This application is based on Japanese patent application No. 2013-061335 filed on Mar. 25, 2013, the contents of which are hereby incorporated by reference.

BACKGROUND OF THE INVENTION

1. Field of the Invention

The present invention relates to a page image displaying device for displaying a page image of a document, and an image forming apparatus.

2. Description of the Related Art

Multi-functional Peripherals (MFPs) known as information equipment for business use are provided with a display on which an operating screen (image for operation) is displayed. For printing a document, the MFP displays an image of a page to be printed in a preview mode on a display combined with an operating panel. The preview mode usually displays a page image showing the appearance of an output state of each of pages of the document. When a user performs predetermined operation for switching between pages, the MFP displays page images, in order, of all the pages of the document.

The MFPs and other type of multifunctional information equipment are provided with a touch-sensitive panel functioning as operation entry means. The touch-sensitive panel herein is a touchpad pointing device used in overlapping relation with a display such as a liquid crystal panel. The surface of the touch-sensitive panel functions both as a screen on which an operating screen is displayed and as a touch screen on which a user performs operation.

A project-type capacitive touch-sensitive panel has capabilities to detect multi-touch actions that are two simultaneous finger touches on the touch screen. This type of touch-sensitive panel is used in mobile information equipment, e.g., a smartphone and tablet personal computer that have been widely used in these days. The touch-sensitive panel is capable of detecting not only single-touch actions such as tap and flick but also multi-touch actions such as pinch and rotate. This enables users to give the information equipment a command via a simple action, even if the command involves complicated actions according to the single-touch actions. For example, a set value of a print magnification can be changed through pinch-in and pinch-out gestures made while the information equipment is put in a preview mode (Japanese unexamined patent application publication No. 2012-123066).

A related technology has been proposed for accepting a predetermined multi-touch action as operation for switching between pages to be displayed. An electronic blackboard switches between images on the screen by one page in accordance with the movement direction of the multi-touch position (Japanese unexamined patent application publication No. 2012-168620).

According to the conventional preview mode in an MFP as discussed above, when page images showing the details of the pages are selectively displayed one by one, the entire page image displayed is replaced with a page image of another page in response to page switch operation. Replacing one page image with another involves processing for rasterizing document data and changing the scaling in accordance with the size of display. The time required for the processing depends on data amount of the page image for replacement.

A user possibly focuses attention on only a part of each page to perform the page switch operation. For example, the user sometimes writes, by hand, page numbers onto document sheets before making a copy or facsimile transmission of the document sheets. The user places the document sheets on a document tray and enters a job start command. In response to the command, the MFP reads images from the document sheets. At this time, the user probably checks whether or not the page numbers are written correctly onto all the pages by previewing the images on the screen. In another case, the user probably checks whether or not a portrait for curriculum vitae or a seal affixed on a paper document is clearly printed. In yet another case, the user may check whether or not description in header/footer is correct.

In conventional technologies, when a user focuses attention on only a part of each page, display of a part to which the user pays no attention is unnecessarily updated in accordance with the page switch operation. This delays the page switch because processing unnecessary for the user is executed. Further, the user possibly focuses his/her eyes on change in part to which no attention is necessary, and thereby he/she overlooks a part to which attention should be paid.

SUMMARY

The present disclosure has been achieved in light of such an issue, and therefore, an object of an embodiment of the present invention is to increase the variety of functions to display a page image of each of pages.

A page image displaying device according to an embodiment of the present invention includes a display unit; a touch-sensitive panel configured to detect a touch action made on a screen of the display unit; a region setting portion configured to set, in a state where the display unit displays a page image of a first page that is any one of pages constituting a document, when the touch-sensitive panel detects a first touch action of designating a part of a page display region in which the page image on the screen is displayed, the designated part as a designated region; and a display control portion configured to keep displaying, when the designated region is set, and when the touch-sensitive panel detects a second touch action of giving a command to changes pages to be displayed from one to another, the page image of the first page in a region other than the designated region of the page display region, and, to change partly what is displayed in the page display region in a manner to display a part of a page image of a second page of the document in the designated region, said part corresponding to a part in position in the designated region of the page image of the first page.

These and other characteristics and objects of the present invention will become more apparent by the following descriptions of preferred embodiments with reference to drawings.

DESCRIPTION OF THE PREFERRED EMBODIMENTS

An MFP having an operating panel on which images can be displayed has a preview mode of displaying the appearance of the finished document that has been subjected to processing or the print state. The preview mode is an example of display of a document page image. In the preview mode, what is displayed on the operating panel can be changed in accordance with a touch action.

Figure 1:
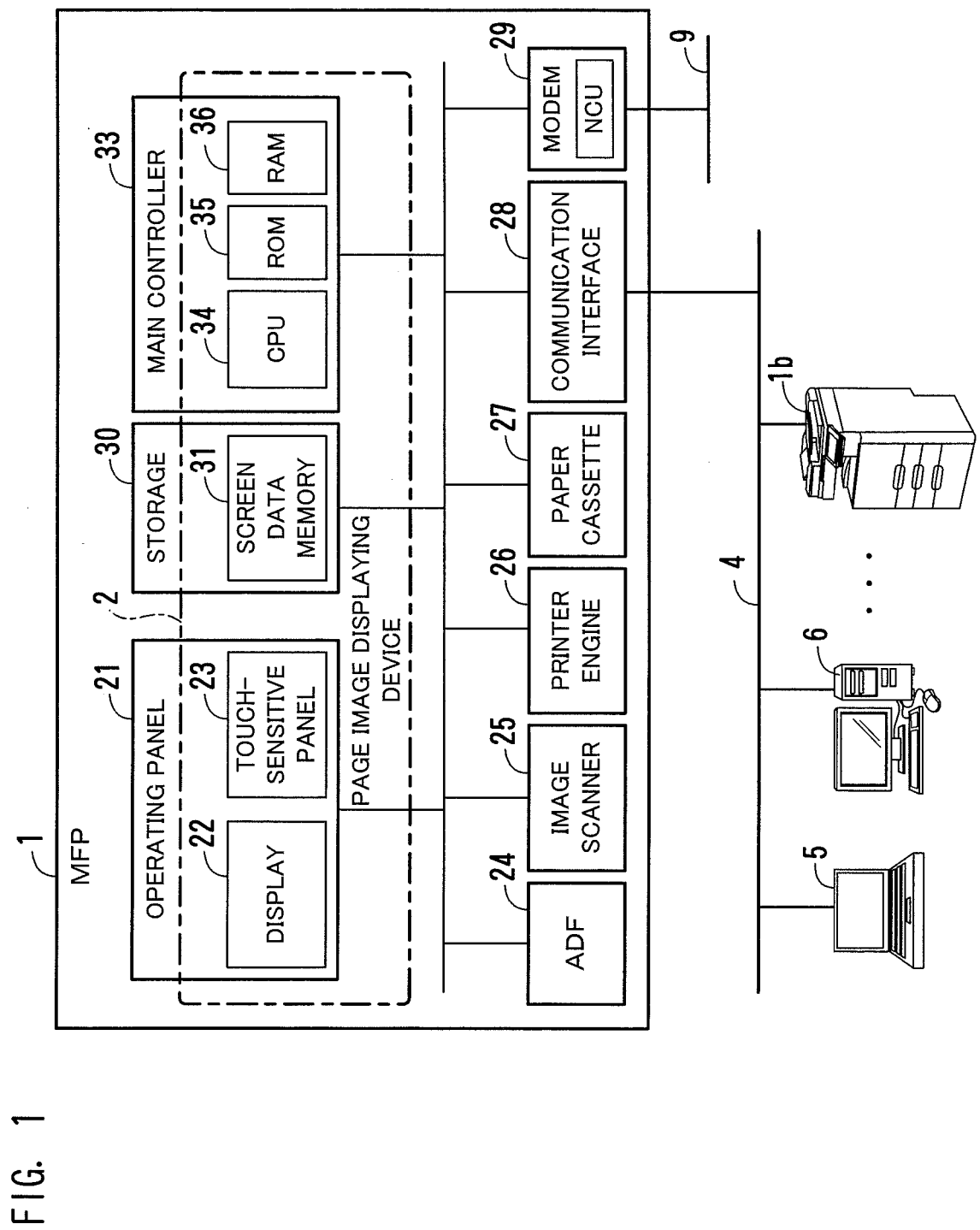
FIG. 1 is a diagram showing an example of the outline of the hardware configuration of an MFP having a page image displaying device according to an embodiment of the present invention.

Referring to FIG. 1, an MFP 1 is multi-functional information equipment available as a copier, a printer, a network scanner, a facsimile machine, and a document server. The MFP 1 is a kind of image forming apparatus because it has a print function such as copying or network printing.

The MFP 1 is connected to a Local Area Network (LAN) 4 constructed in, for example, an office of business, and is capable of performing communication with external devices such as personal computers 5 and 6 and another MFP 1b. The MFP 1 is also capable of performing facsimile communication through a telephone network 9. The MFP 1 acts in response to operation on an operating panel 21 and access from an external device.

The MFP 1 includes the operating panel 21 having a display 22 and a touch-sensitive panel 23, a storage 30 having a storage region a part of which is used as a screen data memory 31, and a main controller 33 for controlling the operation of the MFP 1 collectively. The display 22 is a liquid crystal panel display having a screen size of approximately 8 inches. The touch-sensitive panel 23 is a project-type capacitive pointing device configured to detect multi-touch actions. The touch-sensitive panel 23 outputs a signal corresponding to a touch position on a touch screen provided on the screen of the display 22. The screen data memory 31 serves to store screen components constituting operating screens displayed on the operating panel 21.

The main controller 33 has a Central Processing Unit (CPU) 34 functioning as a computer for executing a control program and a variety of applications, a Read Only Memory (ROM) 35 for storing the control program therein, a Random Access Memory (RAM) 36 used as a work area for program execution, and so on.

The MFP 1 has, as printing-related components, an Auto Document Feeder (ADF) 24, an image scanner 25, a printer engine 26, and a paper cassette 27. The MFP 1 has, as communication-related components, a communication interface 28 and a modem 29. In the case of copying, image input, or facsimile transmission, the ADF 24 feeds a document sheet to a scan position of the image scanner 25. The image scanner 25 serves to optically read out image information recorded on the document sheet. The printer engine 26 is operable to print, through electrophotography, a monochrome or color image onto a single side or both sides of paper supplied from the multi-stage paper cassette 27. The communication interface 28 connects the MFP 1 to the LAN 4. The modem 29 has a Network Control Unit (NCU) for facsimile communication with the use of telephone line.

In printing a document, transferring a document to an external device, or converting a document into facsimile data for transmission, the MFP 1 allows, in response to user's command, the user to work in a preview mode. In the preview mode, the user is allowed to check the processing result or the processing target (document). Stated differently, the MFP 1 has a page image displaying device 2 to provide a preview image. The page image displaying device 2 has hardware components of the display 22, the touch-sensitive panel 23, the screen data memory 31, the CPU 34, the ROM 35, and the RAM 36.

Note that a "document" related to preview is image information based on which an image for each page is visible. Data for the document is, for example, text data prepared by using application on a computer, non-raster data representing a chart, image, etc., and raster data (scanned image) obtained by the image scanner 25.

Figure 2:
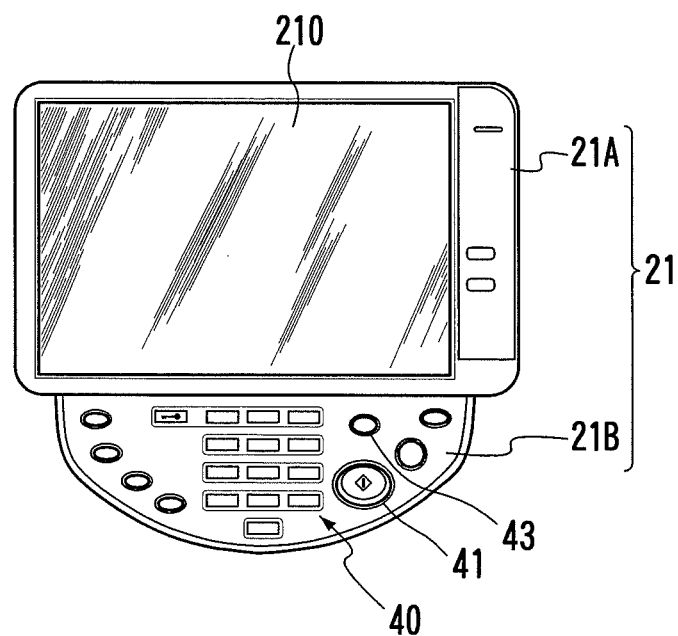
FIG. 2 is a diagram showing an example of a structure of an operating panel of an MFP.

Referring to FIG. 2, the operating panel 21 of the MFP 1 includes a touch-sensitive panel display portion 21A in which the display 22 and the touch-sensitive panel 23 are provided, and a keypad portion 21B having fixed-keys. In the illustrated example, the touch-sensitive panel display portion 21A for displaying different operating screens has a screen 210 also functioning as a touch screen on which a touch action is detected through the touch-sensitive panel. The fixed-keys of the keypad portion 21B are, for example, a key array (numeric keypad) 40 for numerals entry, a start key 41 for starting job execution, and a confirmed key 43 for selecting a copy check mode for previewing an image.

Figure 3:
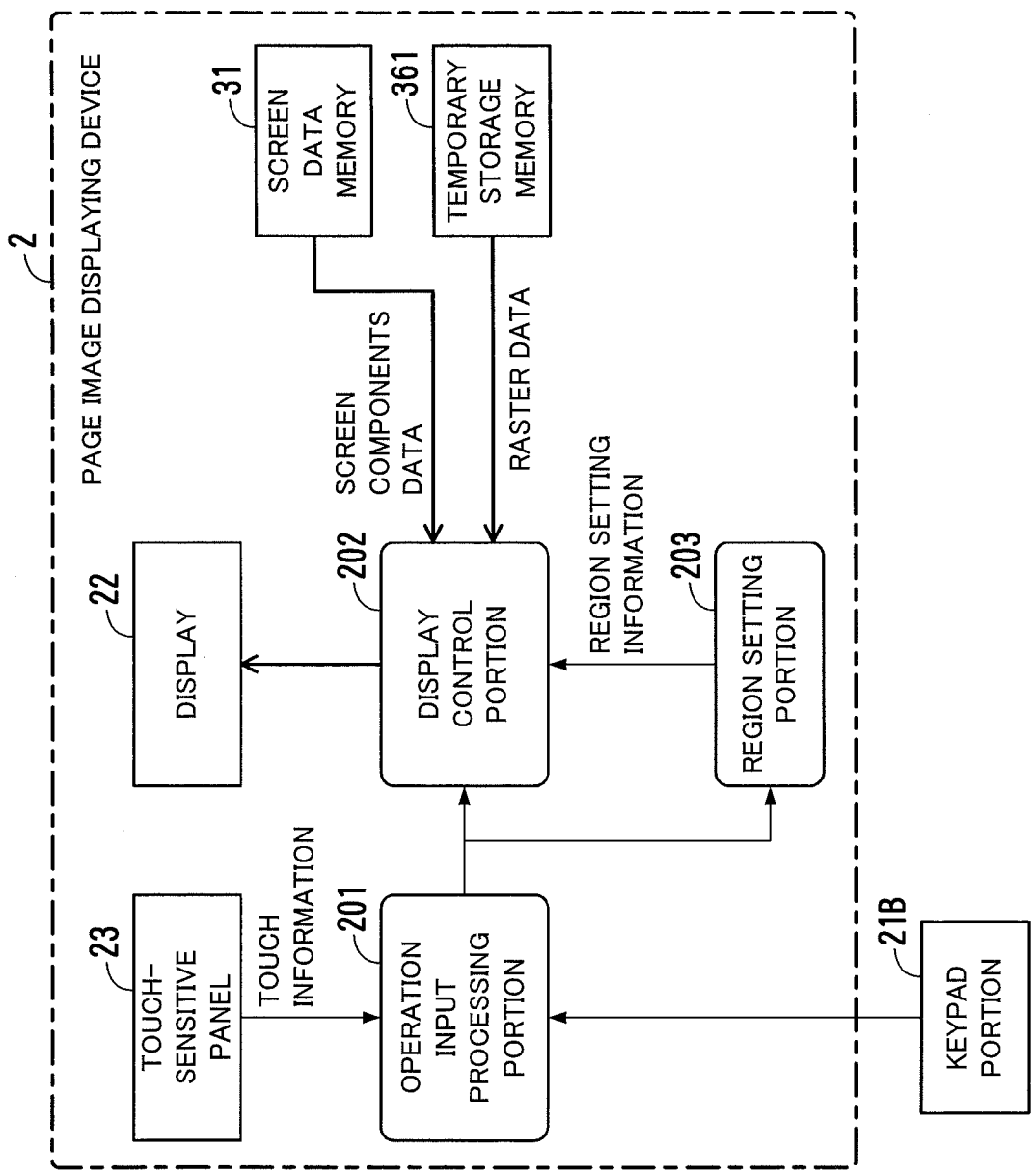
FIG. 3 is a diagram showing an example of the functional configuration of a page image displaying device.

FIG. 3 shows the functional configuration of the page image displaying device 2. The page image displaying device 2 is provided with an operation input processing portion 201, a display control portion 202, a region setting portion 203, and so on. These portions are functional elements implemented at a time when the CPU 34 executes a predetermined program for controlling computer.

The operation input processing portion 201 determines what kind of touch action is made by a user based on touch information indicating a touch position outputted from the touch-sensitive panel 23. To be specific, the operation input processing portion 201 checks whether a gesture of the touch action by the user is tap, double tap, hold (long press), flick, drag/swipe, pinch-in, or pinch-out based on the number of touch points, a period of time during which one point on the surface is touched by the user, and a movement speed of touch point. The check result is given to the display control portion 202 and the region setting portion 203.

When receiving a signal indicating key operation related to a preview mode from the keypad portion 21B, the operation input processing portion 201 informs the display control portion 202 of a user command. For example, when the confirmed key 43 is pressed in the standby state, the display control portion 202 is informed that the copy check mode is selected. When the start key 41 is pressed in the copy check mode, the display control portion 202 is informed that a command to finish the preview mode is entered.

The display control portion 202 switches between operating screens, and makes a partial change to indication made on the operating screen, e.g., scroll, pop-up, and highlight in accordance with operation by the user. The display control portion 202 combines screen components data appropriately read out from the screen data memory 31, and thereby creates an operating screen to be displayed. At this time, if the operating screen being created has a preview region, then raster data read out from the temporary storage memory 361 is put, as a page image, in the preview region. The raster data read out from the temporary storage memory 361 is data obtained by converting, for the preview mode, the resolution of scanned image data or raster data prepared based on description by a page description language or Hypertext Markup Language (HTML).

When setting a designated region, the region setting portion 203 gives the display control portion 202 region setting information for specifying the designated region. The designated region herein is a part, selected by the user, of a page display region in which a page image for one page is displayed in the preview mode. When not being given the region setting information, the display control portion 202 changes the entire page image displayed to a page image of another page in accordance with page switch operation. On the other hand, when given the region setting information, the display control portion 202 performs "partial page switch" in which not the entirety of a page image but a part of the page image corresponding to the designated region is changed.

The region setting portion 203 sets a designated region in response to a predetermined touch action performed when an operating screen having a preview region is displayed. For example, in response to a touch action for moving a touch point vertically or horizontally to cross over a page display region of the preview region, the region setting portion 203 sets, as the designated region, one of two parts obtained by sectioning the page display region vertically or horizontally in accordance with the touch action.

Figure 4:
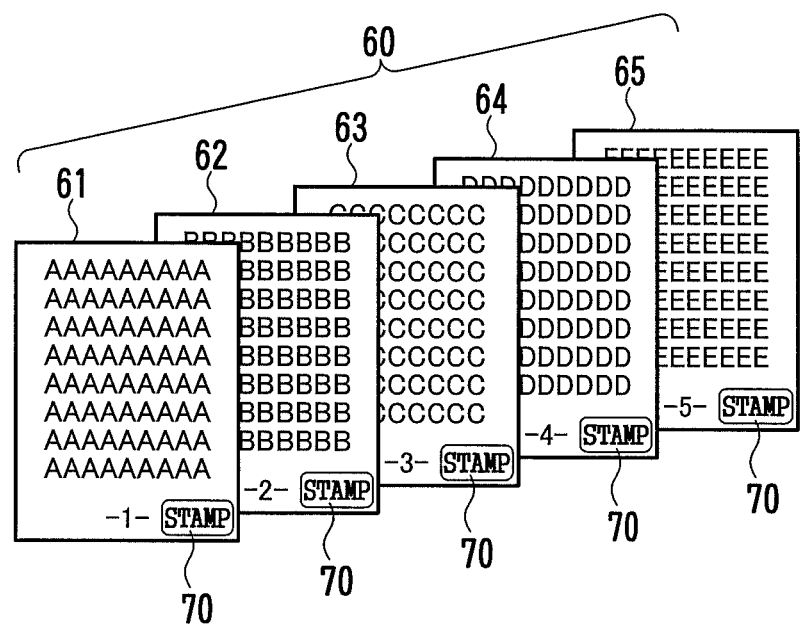
FIG. 4 is a diagram showing an example of document page images displayed by a page image displaying device.

FIG. 4 shows an example of document page images displayed by the page image displaying device 2. A document 60 in FIG. 4 has five pages. The number of pages of the document is, however, not limited to five. FIG. 4 schematically shows page images 61, 62, 63, 64, and 65 of the five pages.

All the page images 61, 62, 63, 64, and 65 have the same stamp image 70 at the lower right corner thereof. It is supposed that the stamp images 70 are added to the document 60 by using a stamp function of the MFP 1. The stamp function is to add a stamp image such as "urgent", "circular", or "confidential" to a page, specified by a user, of a document which is to be printed, transmitted, or saved.

Figure 5:
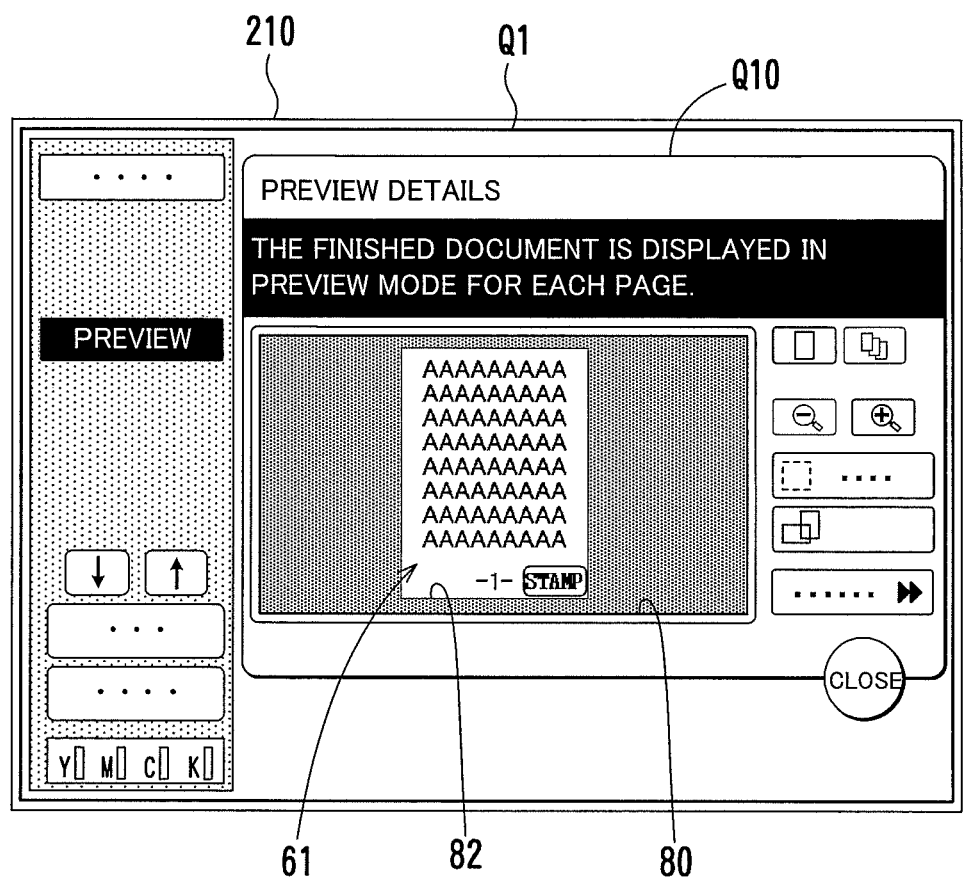
FIG. 5 is a diagram showing an example of a layout of a preview display region in an operating panel.

As shown in FIG. 5, in response to predetermined operation for displaying a preview image, an operating screen Q1 including a preview window Q10 is displayed on the screen 210 of the operating panel. In copying a document image, for example, the user makes desired settings, as necessary, for magnification, color, and so on, presses the confirmed key 43, and then, presses the start key 41. In response to the operation, document images are read out from document sheets placed on the ADF 24 before the start key 41 is pressed. The preview window Q10 is then displayed as a part of the operating screen Q1.

The preview window Q10 has a preview region 80 where a preview image is laid out. Above the preview region 80, a field is provided in which a message for preview appears. On the right of the preview region 80, a button for selecting the preview mode, a button for giving a command to close the preview window Q10, and so on are provided. In a mode of displaying preview images on a page-by-page basis, a page image of the top page is displayed first. Referring to FIG. 5, among the page images 61, 62, 63, 64, and 65 to be displayed as preview images shown in FIG. 4, the page image 61 for the top page is displayed. Hereinafter, a rectangle region in which a page image for one page is displayed is referred to as a "page display region 82".

In a region other than the page display region 82 of the preview region 80, there are displayed (not shown in FIG. 5) the number of pages of a preview target document and the page number of document sheet currently displayed, paper size, paper orientation (portrait/landscape), print magnification, and so on in the form of letters or graphics.

In the MFP 1, when the user makes a flick or swipe gesture horizontally starting from a position in the page display region 82, a page displayed in the preview mode is changed to another page. In this embodiment, "partial page switch" is performed in which only a part of a page image is changed to a page image of another image. The user can specify any part of the page display region 82 as a designated region in which page images are switched from one to another.

Figure 6:
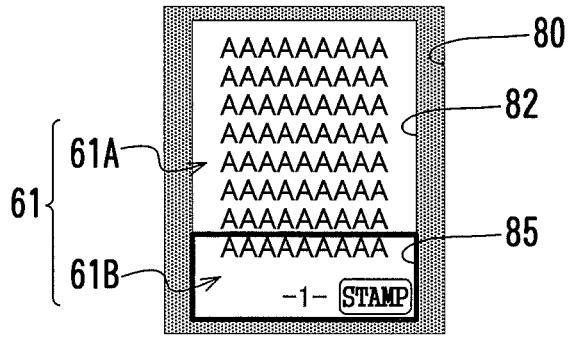
FIG. 6 is a diagram showing an example of advancing page in a page image in a preview mode.
Figure 6:
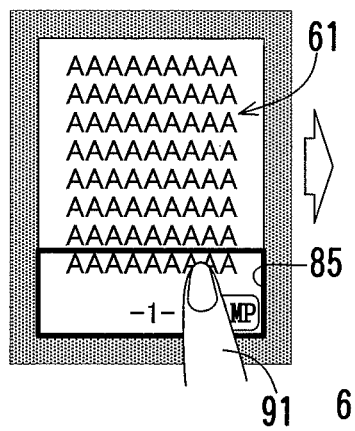
Figure 6:
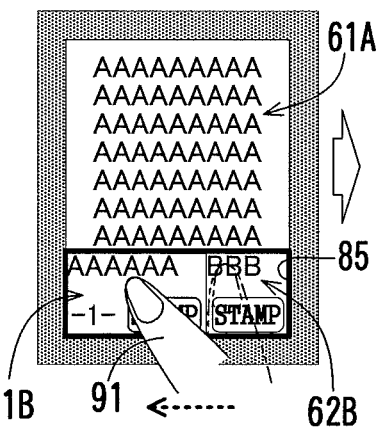
Figure 6:
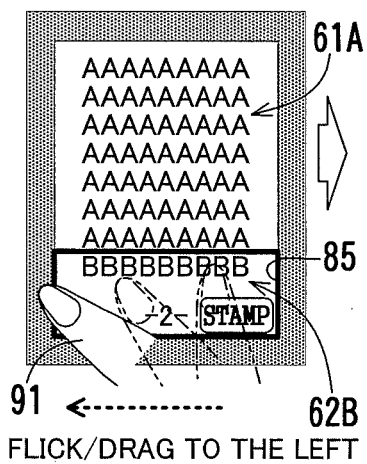
Figure 6:
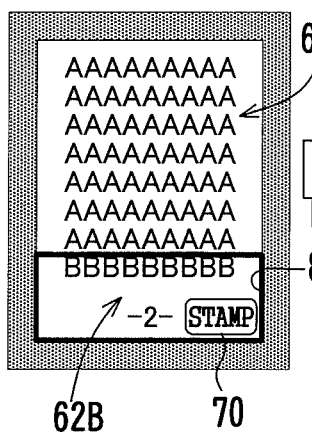
Figure 6:
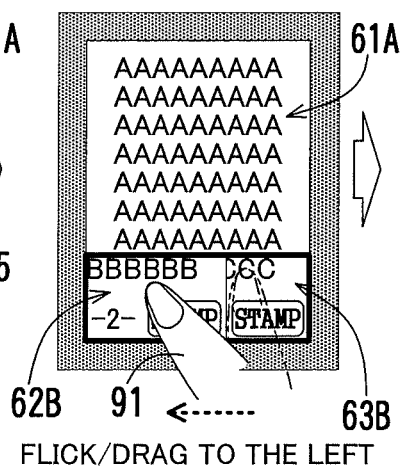
Figure 6:
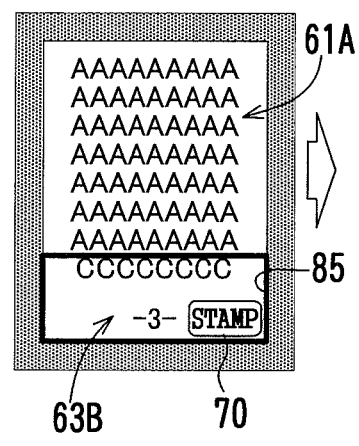
Figure 7:
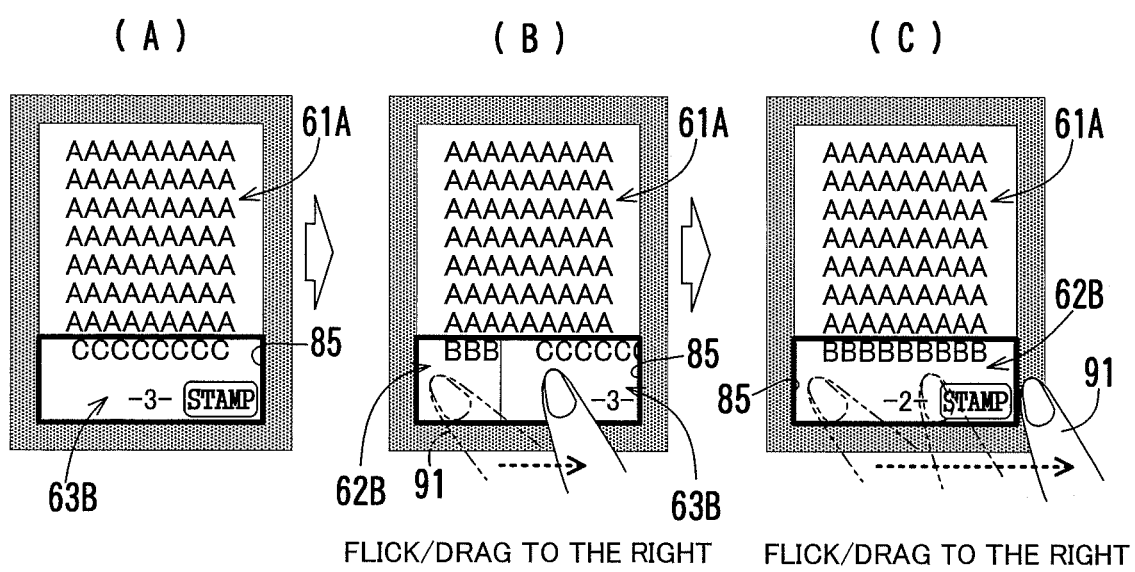
FIG. 7 is a diagram showing an example of turning back page in a page image in a preview mode.

FIGS. 6 and 7 show an example of the partial page switch. FIG. 6 shows an example of advancing page in which the page image currently displayed is changed to a page image having a larger page number. FIG. 7 shows an example of turning back page in which the page image currently displayed is changed to a page image having a smaller page number. The following description takes an example in which a user touches the touch screen with his/her finger. Instead of finger, the user may touch the touch screen with a stylus or another tool.

In (A) of FIG. 6, the page display region 82 is shown within which a page image 61 of a first page is displayed. In the page display region 82, a designated region 85, which is enclosed by a thick line in the drawing, is set in accordance with operation for defining a region described later. The illustrated designated region 85 corresponds to a lower part of the page display region 82. The designated region 85 is set as described above, so that the page image 61 is divided into an image-to-be-switched 61B corresponding to the designated region 85 of the page display region 82 and an image-not-to-be-switched 61A corresponding to the other part of the page display region 82.

The user touches the designated region 85 with a finger 91 as shown in (B) of FIG. 6. The user then performs a gesture of moving the fingertip over the surface without losing contact (the operation being called slide) as shown in (C) of FIG. 6. The slide gesture includes flick of quickly brushing the surface with the finger 91, and drag of moving the finger 91 over the surface without losing contact (drag being sometimes called swipe). When the user makes the slide gesture of moving the finger 91 to the left as shown in (C) of FIG. 6, the image-to-be-switched 61B of the page image 61 moves to the left together with the movement of the fingertip. Thereby, an image-to-be-switched 62B appears which corresponds to a designated region 85 in a page image 62 of the next page. A part of the image-to-be-switched 61B is not displayed which is beyond the designated region 85 due to the movement of the image-to-be-switched 61B.

As the image-to-be-switched 61B is moved, the area in which the image-to-be-switched 62B is displayed increases gradually in the designated region 85. Referring to (D) of FIG. 6, what is displayed in the designated region 85 is completely switched from the image-to-be-switched 61B of the first page to the image-to-be-switched 62B of the second page. In this way, what is displayed in the designated region 85 is changed from one to another while the image-not-to-be-switched 61A of the page image 61 remains unchanged.

Since only what is displayed in the designated region 85 is changed from one to another, the amount of data subjected to display processing is smaller than that in the case where the entirety of what is displayed in the page display region 82 is changed to another. This increases the speed of display switch. Further, a part of the page image displayed in the designated region 85 after the display switch is a part of the next page image corresponding to the part of the page image displayed immediately before the display switch. This enables the user to quickly check what is displayed on the corresponding parts of both the page images. In conventional technologies, in order to display the top of a page at the time of page switch, the user has to scroll through the page to display the bottom of the page, for example. In contrast, the MFP 1 sets the bottom of a page as the designated region 85, which saves the user from having to scroll the screen every time when pages are switched from one to another. In addition, what is displayed in the image-not-to-be-switched 61A remains unchanged, which allows the user to pay attention to what is displayed in the designated region 85.

The display state in (E) of FIG. 6 is the same as that in (D) of FIG. 6. The user can check what is displayed in the image-to-be-switched 62B with the designated region 85 not hidden by finger. For example, the user can confirm that the stamp image 70 is laid out appropriately also in the second page.

Referring to (F) of FIG. 6, the user makes a slide gesture of moving the finger 91 to the left as with the case shown in (C) of FIG. 6. The slide gesture moves the image-to-be-switched 62B of the second page to the left. In association with that, a part of an image-to-be-switched 63B of a third page appears which corresponds to the designated region 85. Referring to (G) of FIG. 6, what is displayed in the designated region 85 is completely switched from the image-to-be-switched 62B of the second page to the image-to-be-switched 63B of the third page.

The display state in (A) of FIG. 7 is the same as that in (G) of FIG. 6. The user performs the same gesture as that for advancing page except for the direction in which he/she makes a slide gesture with the finger. The user thereby causes the page image displaying device 2 to turn back page. Referring to (B) of FIG. 7, when the user makes a slide gesture of moving the finger 91 to the right without losing contact from the designated region 85, the image-to-be-switched 63B of the third page moves to the right. In connection with this, the image-to-be-switched 62B of the previous page appears in the designated region 85. A part of the image-to-be-switched 63B is not displayed which is beyond the designated region 85 due to the movement of the image-to-be-switched 63B. As the image-to-be-switched 63B is moved, the area in which the image-to-be-switched 62B is displayed increases gradually in the designated region 85. Referring to (C) of FIG. 7, what is displayed in the designated region 85 is completely switched from the image-to-be-switched 63B of the third page to the image-to-be-switched 62B of the second page. As with the case of advancing page, in the case of turning back page, what is displayed in the designated region 85 is changed from one to another while the image-not-to-be-switched 61A of the page image 61 remains unchanged.

FIGS. 8-12 show examples of a touch action for designating a part of a page display region and a designated region set by the touch action.

Figure 8:
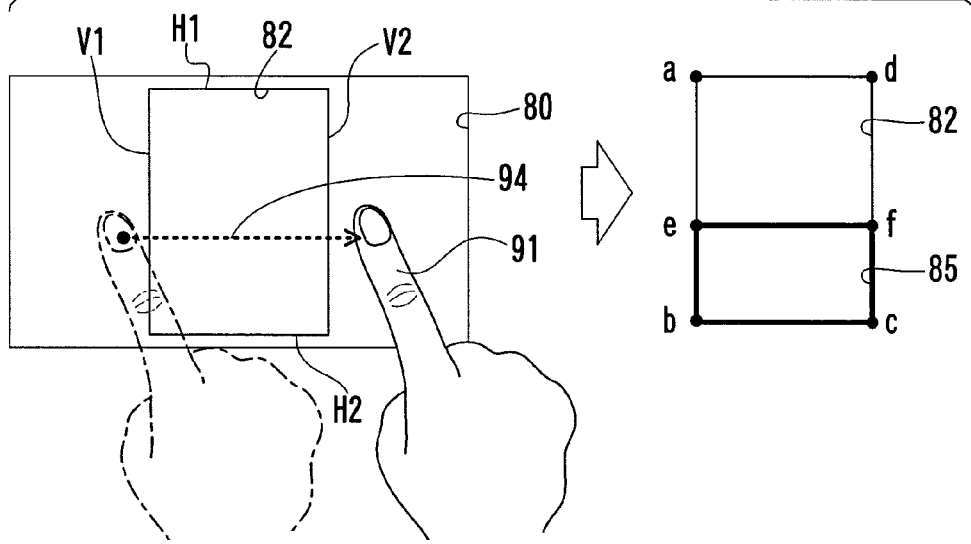
FIG. 8 is a diagram showing a first example of a touch action for specifying a part of a page display region and a designated region set by the touch action.
Figure 8:
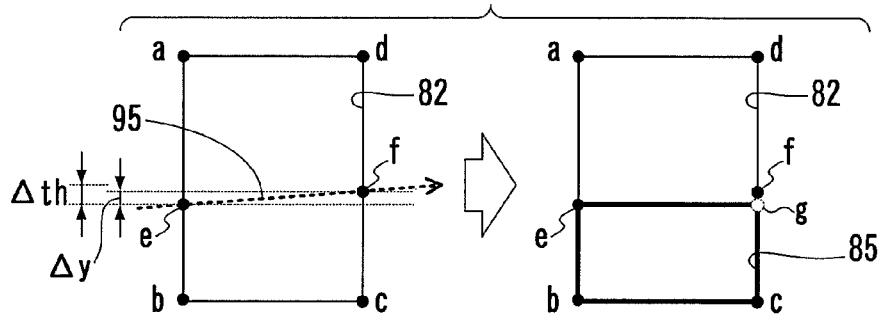
Figure 8:
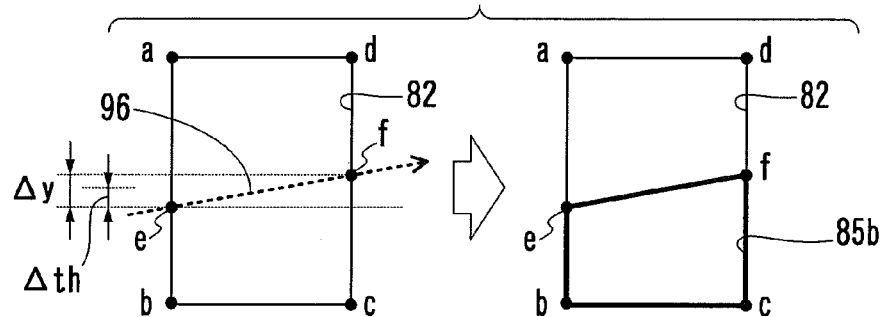

Referring to the left of (A) of FIG. 8, the page display region 82 is shown in the preview region 80. The page display region 82 is sectioned into two parts by a touch action of sliding the finger 91 to cross over the page display region 82 from one position to another position of the outer edge thereof. The positions where the finger 91 crosses over the page display region 82 may be any positions on an edge constituted by a left side V1, a right side V2, an upper side H1, and a lower side H2. FIG. 8 shows an example in which the finger 91 crosses over the edge from one side to a side opposite thereto.

Referring to (A) of FIG. 8, a track 94 of the finger 91 via the slide gesture is shown by the arrow of a broken line. According to the track 94, the finger 91 moves from the outside of the page display region 82, passes through the left side V1, crosses over the page display region 82, moves straight, and passes through the right side V2 to the outside of the page display region 82. As shown in the drawing, it is supposed that the four vertices of the page display region 82 are denoted by a, b, c, and d, that the position on the left side V1 through which the finger 91 passes is denoted by e, and that the position on the right side V2 through which the finger 91 passes is denoted by f. The page display region 82 (quadrilateral abcd) is sectioned into a quadrilateral aefd and a quadrilateral ebcf by a line connecting the point e and the point f on the track 94.

Of the two quadrilaterals aefd and ebcf, one quadrilateral having a smaller area is set as the designated region 85 in this embodiment. In (A) of FIG. 8, the quadrilateral ebcf is set as the designated region 85.

As shown in (B) of FIG. 8, even when the direction along which the finger 91 slides is somewhat inclined within the page display region 82, a rectangle area is set as the designated region 85. To be specific, if the difference Δy between the point e and the point f on a track 95 in position in the vertical direction is smaller than a threshold Δth, then a quadrilateral ebcg is set as the designated region 85. The quadrilateral ebcg has a point g as one of the vertices. The point g is positioned on the right side V2 to vertically correspond to the position of the point e on the left side V1 from which the finger 91 starts sliding.

In contrast, as shown in (C) of FIG. 8, if the difference Δy between the point e and the point f on a track 96 in position in the vertical direction is greater than the threshold Δth, then a quadrilateral ebcf is set as the designated region 85. The quadrilateral ebcf has, as one of the vertices, a point f at which the finger 91 stops sliding. The designated region 85 for this case is a trapezoid.

In addition to the foregoing cases, the designated region 85 is also set for a case where the user makes a touch action of moving the finger vertically from the upper side toward the lower side to section the page display region 82 vertically.

Figure 9:
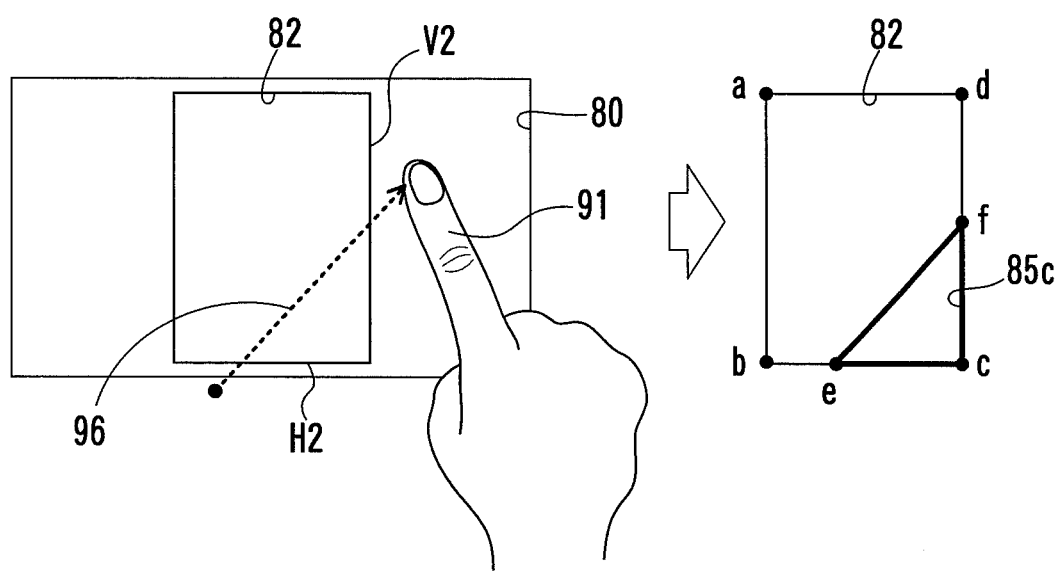
FIG. 9 is a diagram showing a second example of a touch action for specifying a part of a page display region and a designated region set by the touch action.

FIG. 9 shows an example in which the user makes a touch action of moving the finger 91 from one side to another side which are not opposite to each other of the page display region 82. In the illustrated example, the finger 91 slides to cross over the page display region 82 from a lower side H2 to a right side V2. In such a case, it is supposed that the position on the lower side H2 from which the finger 91 starts sliding is denoted by e, and that the position on the right side V2 at which the finger 91 stops sliding is denoted by f. Due to the slide gesture, the page display region 82 is sectioned into a pentagon abefd and a triangle ecf by a line connecting the point e and the point f on the track 96. The triangle ecf having an area smaller than that of the pentagon abefd is set as a designated region 85*c*.

Figure 10:
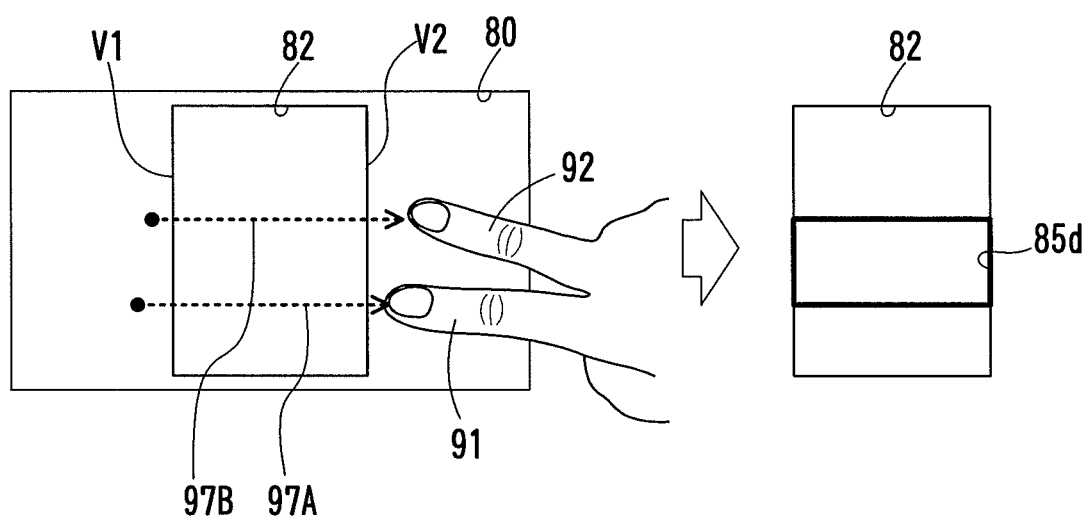
FIG. 10 is a diagram showing a third example of a touch action for specifying a part of a page display region and a designated region set by the touch action.

Referring to FIG. 10, a designated region 85*d* does not contain the four vertices a, b, c, and d of the page display region 82. The user makes a slide gesture of moving two fingers 91 and 92 to make two tracks 97A and 97B which cross over the page display region 82. In the example, the tracks 97A and 97B are shown which pass through the left side V1 and the right side V2. In such a case, a quadrilateral enclosed by the two tracks 97A and 97B, the left side V1, and the right side V2 is set as the designated region 85*d*.

Figure 11:
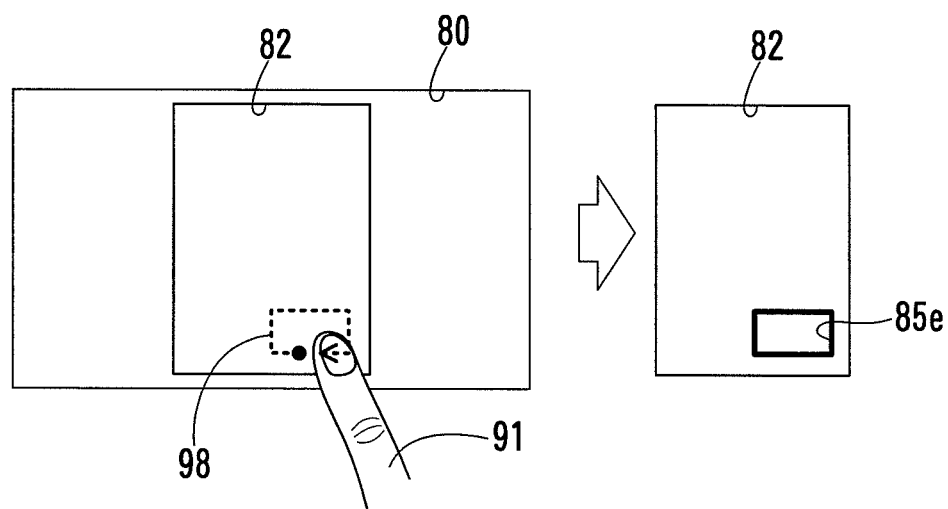
FIG. 11 is a diagram showing a fourth example of a touch action for specifying a part of a page display region and a designated region set by the touch action.

As shown in FIG. 11, when the user makes a slide gesture of moving the finger 91 to draw a quadrilateral enclosing a desired part of the page display region 82 without losing contact therefrom. In such a case, the quadrilateral region corresponding to the track 98 is set as a designated region 85*e*.

Figure 12:
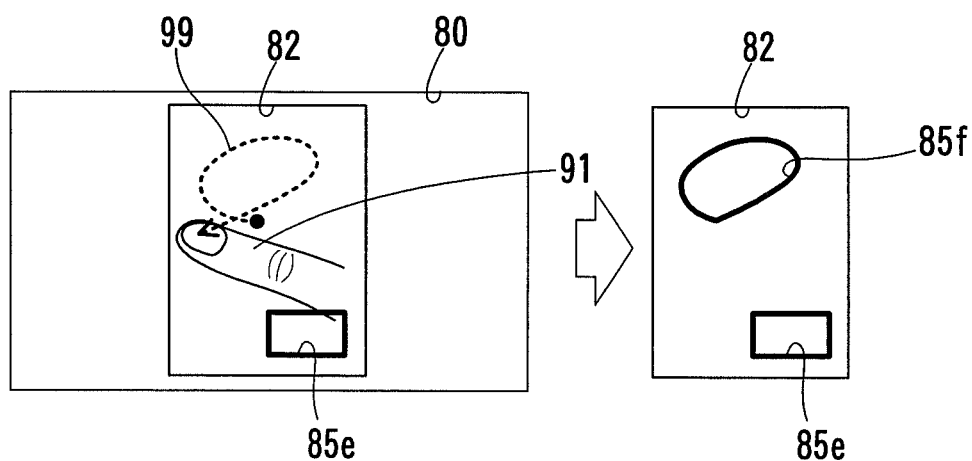
FIG. 12 is a diagram showing a fifth example of a touch action for specifying a part of a page display region and a designated region set by the touch action.

The user is allowed to designate a plurality of designated regions in the page display region 82. FIG. 12 shows an example in which, when the designated region 85*e* having a quadrilateral shape is already set, the user makes a slide gesture of moving the finger 91 to lasso and cross in a region other than the designated region 85*e* of the page display region 82, i.e., to make a circular motion. In such a case, a region corresponding to a track 99 and having an indefinite shape is set as another designated region 85*f*.

The designated regions set as discussed above are also used, as shown in FIGS. 13 and 14, as target regions for partial display switch that is not partial page switch.

Figure 13:
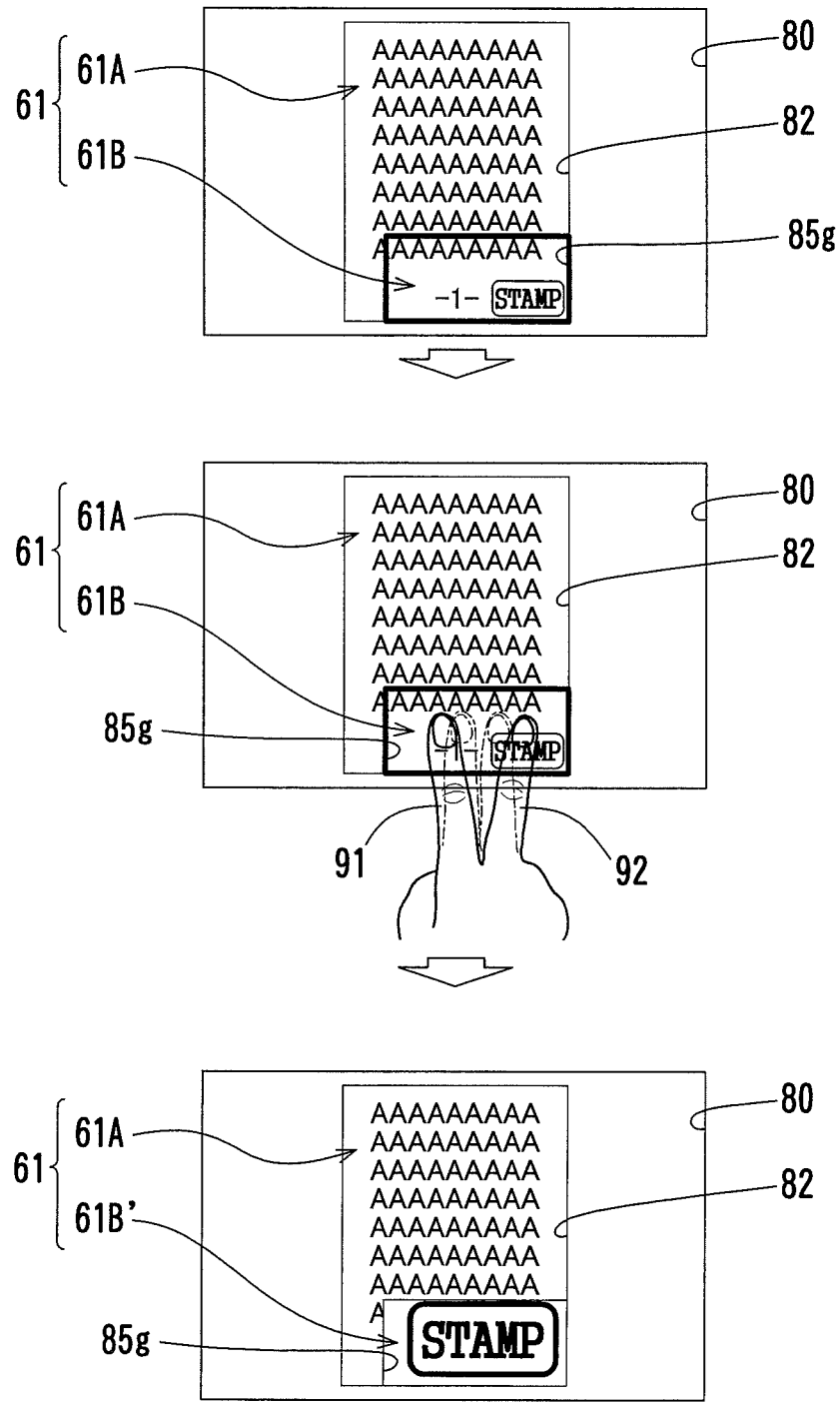
FIG. 13 is a diagram showing an example of enlarged display of a partial page image.

FIG. 13 is a diagram showing an example of enlarged display of a partial page image. Referring to the top drawing of FIG. 13, a designated region 85*g* is set in the page display region 82 of the preview region 80. The page image 61 is displayed in the display region 82. The page image 61 is divided into an image-to-be-switched 61B corresponding to the designated region 85*g* and an image-not-to-be-switched 61A corresponding to a region other than the designated region 85*g* of the page display region 82

In response to a pinch-out gesture of touching the designated region 85*g* with two fingers and moving the fingers apart as shown in the middle drawing of FIG. 13, an image-to-be-switched 61B' which is an enlarged version of the image-to-be-switched 61B is displayed in the designated region 85*g* as shown in the bottom drawing of FIG. 13. Although being not shown, in response to a pinch-in gesture of touching the designated region 85*g* with two fingers and bringing the fingers closer together, a switched image obtained by reducing the image-to-be-switched 61B is displayed.

Figure 14:
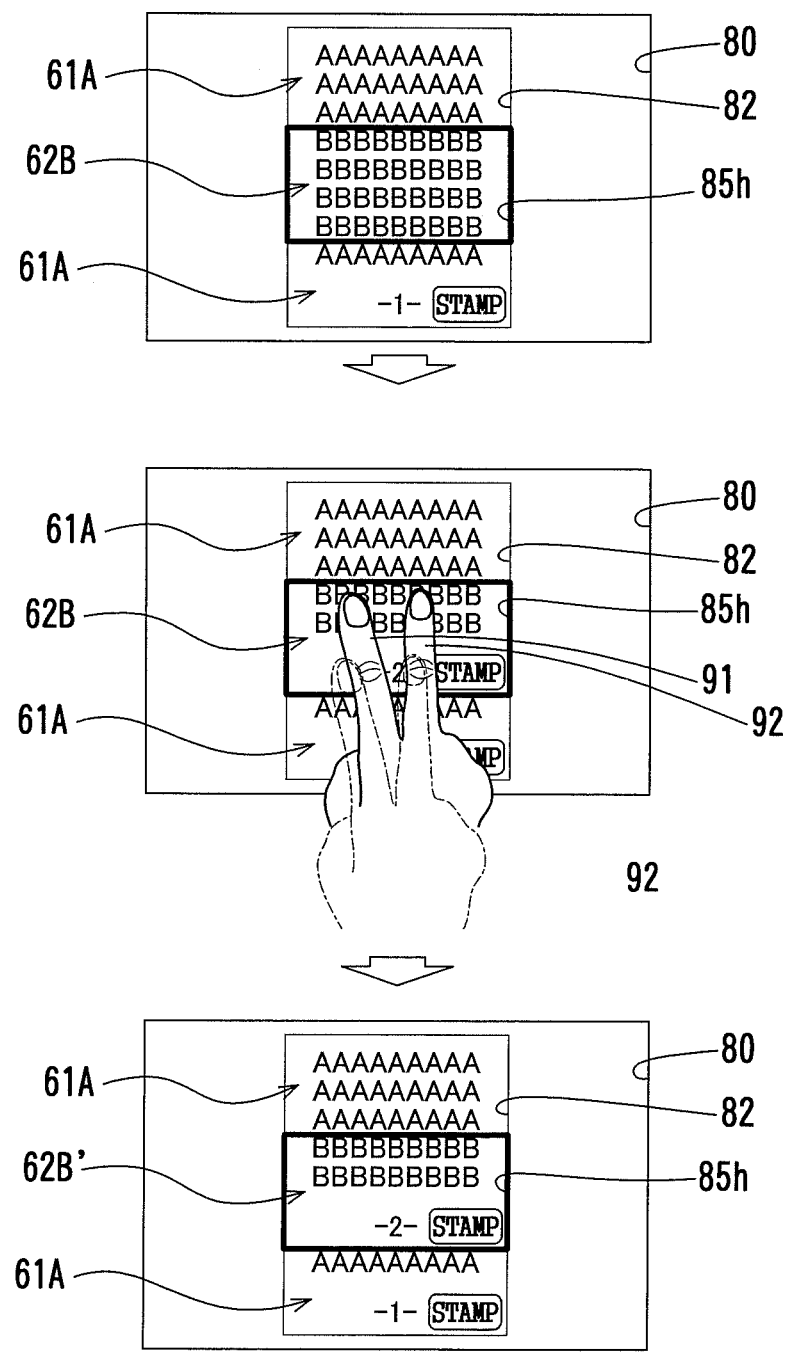
FIG. 14 is a diagram showing an example of moved display of a partial page image.

FIG. 14 is a diagram showing an example of moved display of a partial page image. As shown in the top drawing of FIG. 14, a designated region 85*h* is set in the page display region 82. In the page display region 82, an image-to-be-switched 62B of the second page is displayed in the designated region 85*h*, and an image-not-to-be-switched 61A of the first page is displayed in a region other than the designated region 85*h*.

In response to a drag gesture of touching the designated region 85*h* with the two fingers 91 and 92 concurrently, sliding the same with the fingers 91 and 92 without losing contact therefrom as shown in the middle drawing of FIG. 14, the second page is scrolled trough in synchronization with the slide, so that the image-to-be-switched 62B is changed. To be specific, what is displayed in the designated region 85*h* is updated appropriately in accordance with the slide as if what is displayed in the designated region 85*h* moves. The designated region 85*h* functions as a window in which the second page is partly displayed. When the fingers 91 and 92 are taken off the touch screen and finish sliding (the user removes the fingers 91 and 92 from the touch screen and finishes sliding with the fingers 91 and 92), an image-to-be-switched 62B' which corresponds to an image in the scrolled state at the end of sliding is displayed in the designated region 85*h* as shown in the bottom drawing of FIG. 14.

Figure 15:
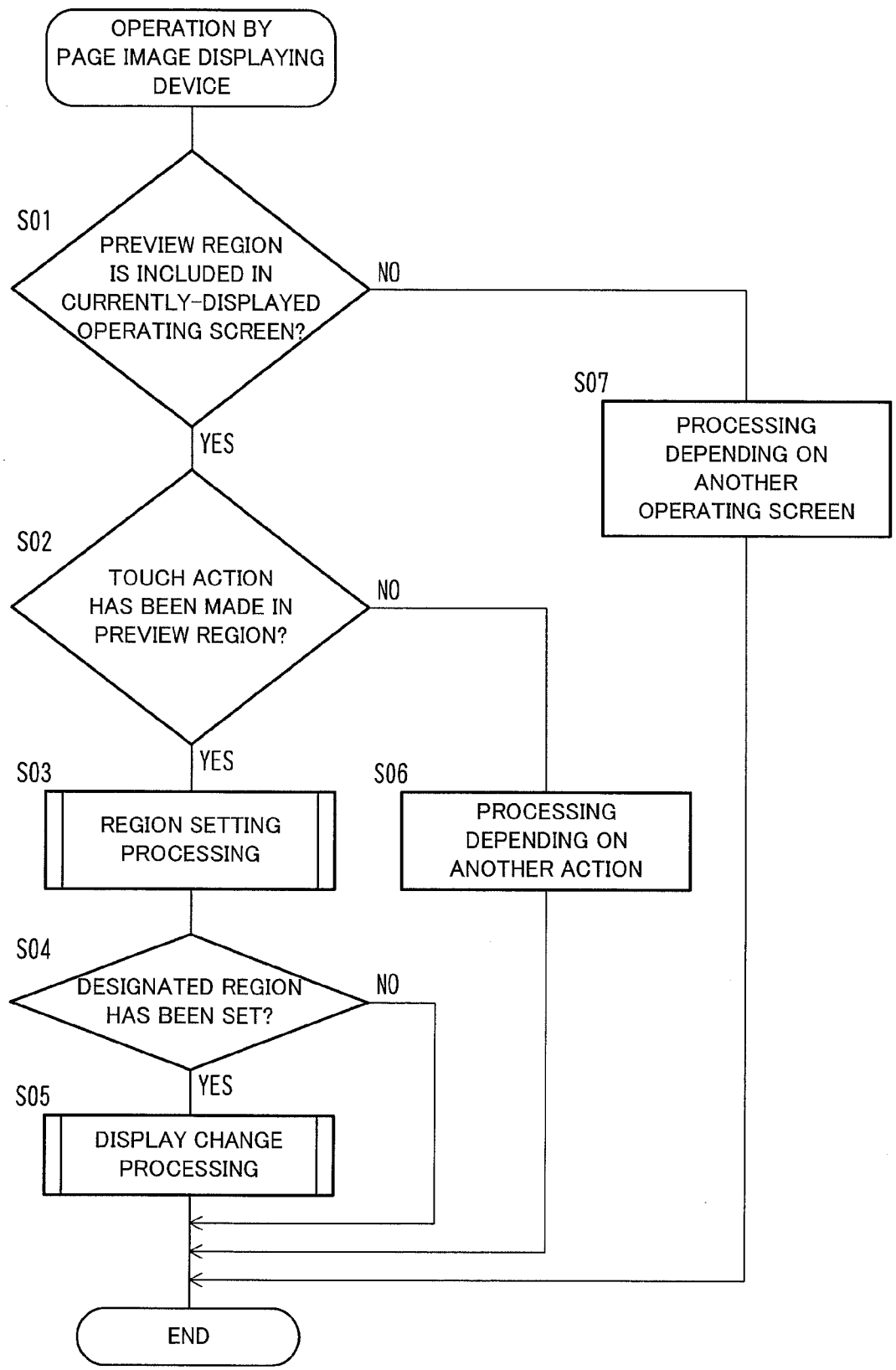
FIG. 15 is a flowchart depicting an example of the outline of operation by a page image displaying device.

FIG. 15 is a flowchart depicting an example of the outline of the operation by the page image displaying device 2.

If an operating screen displayed in the page image displaying device 2 has a preview region 80 (Yes in Step S01), and if an action of touching the preview region 80 is made (Yes in Step S02), then the page image displaying device 2 performs region setting processing (Step S03). Then, if a designated region is preset (Yes in Step S04), then the page image displaying device 2 performs display change processing.

On the other hand, if the operating screen displayed in the page image displaying device 2 has no preview region 80 (No in Step S01), then the process goes to Step S07 in which the page image displaying device 2 performs processing depending on other operating screens. If an operating screen with a preview region 80 is displayed and if a gesture of touching a region other than the preview region 80 is made (Yes in Step S01, and No in Step S02), then the page image displaying device 2 performs processing depending on other operation (Step S06).

Figure 16:
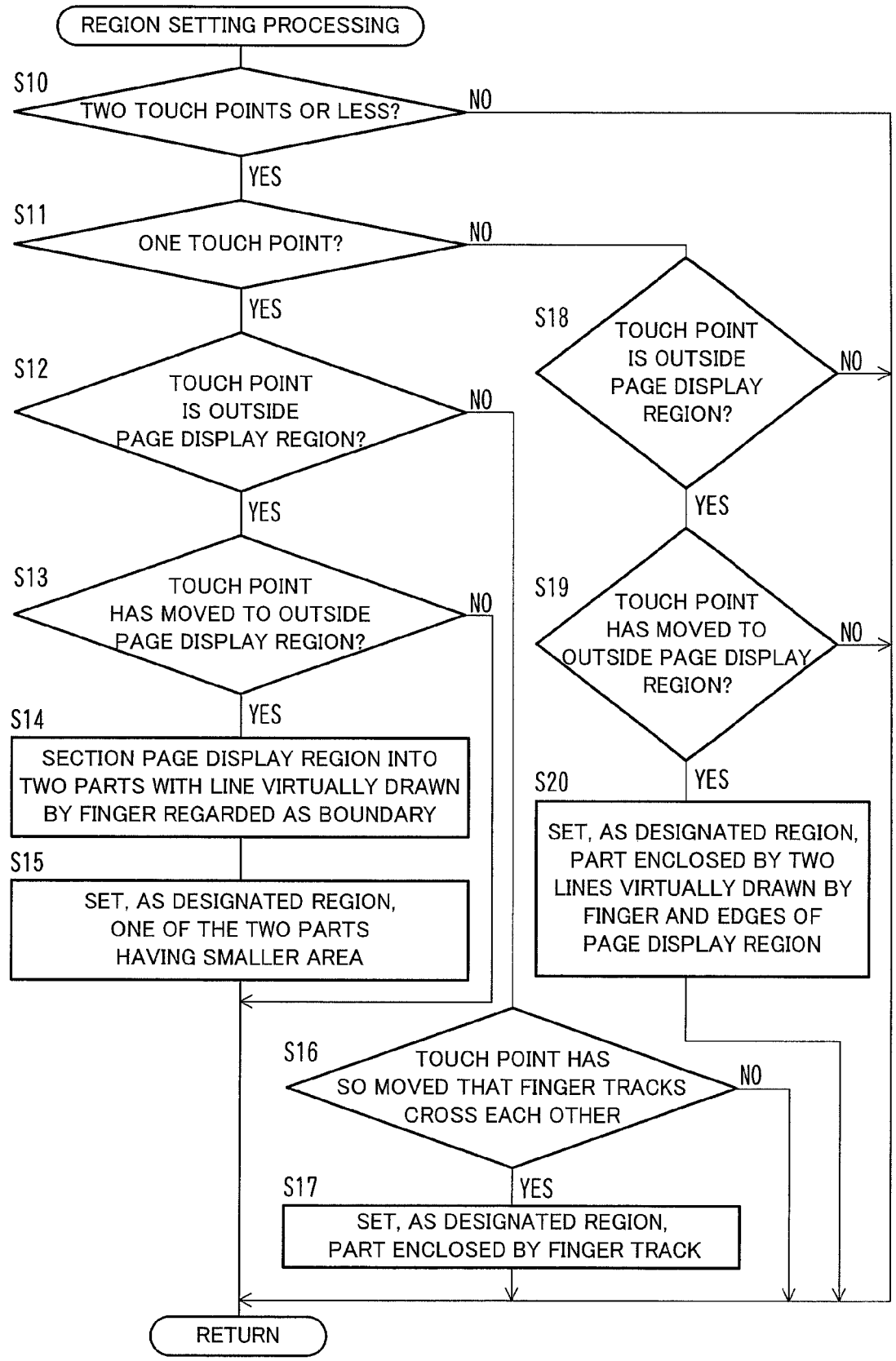
FIG. 16 is a flowchart depicting an example of a region set processing routine performed by a page image displaying device.

FIG. 16 depicts a region setting processing routine. In the routine, the operation input processing portion 201 (see FIG. 3) determines whether or not a touch action detected on the touch-sensitive panel 23 corresponds to predetermined region designating operation related to a designated region. When the touch action is detected to correspond to the region designating operation, the region setting portion 203 sets a designated region in accordance with a track of the touch position with finger. The details are provided below.

The operation input processing portion 201 checks whether points on the touch screen onto which the user touched (touch points) is one or two (Step S10). If the touch points are three or more (No in Step S10), then the operation is disabled. In such a case, the processing according to the routine is finished.

If the number of touch points is one (Yes in Step S11), then the operation input processing portion 201 checks whether or not the touch point is positioned outside the page display region 82 of the preview region 80 (Step S12). If the check result is YES, then the operation input processing portion 201 further checks whether or not a slide gesture of moving the finger on the surface without losing contact is performed, and also checks whether or not a touch point at the end of sliding is positioned outside the page display region 82 of the preview region 80 (Step S13). By making the foregoing checks, it is determined whether or not a slide gesture of crossing over the page display region 82 from one position to another of the outer edge thereof was performed.

If the check result in Step S13 is YES, then he region setting portion 203 sections the page display region 82 with a line virtually drawn on the touch screen via the slide gesture, i.e., with the track of the finger via the slide gesture regarded as a boundary (Step S14). The region setting portion 203 then calculates areas (number of pixels) of the two parts obtained by sectioning the page display region 82. The region setting portion 203 then sets, of the two parts, a part having a smaller area as the designated region 85, 85*b*, or, 85*c* (see FIGS. 8 and 9) (Step S15).

The case where the check result in Step S13 is NO means that the slide gesture is so made to pass through only one point on the outer edge of the page display region 82. Such a touch action is determined to be disabled. Therefore, the processing is finished in such a case without setting a designated region.

The case where the check result in Step S12 is NO means that the position of a touch point is within the page display region 82. In such a case, the processing goes to Step S16. In Step S16, the operation input processing portion 201 checks whether or not a slide gesture of moving the finger on the page display region 82 while maintaining smooth continuous contact is made, and also checks whether or not the track of the finger via the slide gesture connects to the track itself.

If the check result in Step S16 is YES, then the region setting portion 203 sets a part within the page display region 82 enclosed by the track of the finger via the slide gesture as the designated region 85e or 85f (see FIGS. 11 and 12) (Step S17). If the check result in Step S16 is NO, then the region setting portion 203 sets no designated regions, and finishes the processing.

On the other hand, if the number of touch points is not one (No in Step S11), then the processing goes to Step S18. In Step S18, the operation input processing portion 201 checks whether or not two touch points are positioned outside the page display region 82 of the preview region 80. If the check result is YES, then the operation input processing portion 201 further checks whether or not a touch position at the end of the slide gesture made with fingers is outside the page display region 82 of the preview region 80 (Step S19). Through the foregoing checks, it is determined whether or not a slide gesture of crossing over the page display region 82 from one position to another of the outer edge thereof was performed.

If the check result in Step S19 is YES, then the region setting portion 203 sets, as the designated region 85d (see FIG. 10), a part enclosed by two lines that show the track of the fingers via the slide gesture and are virtually drawn on the touch screen, and the edges of the page display region 82 (Step S20).

Figure 17:
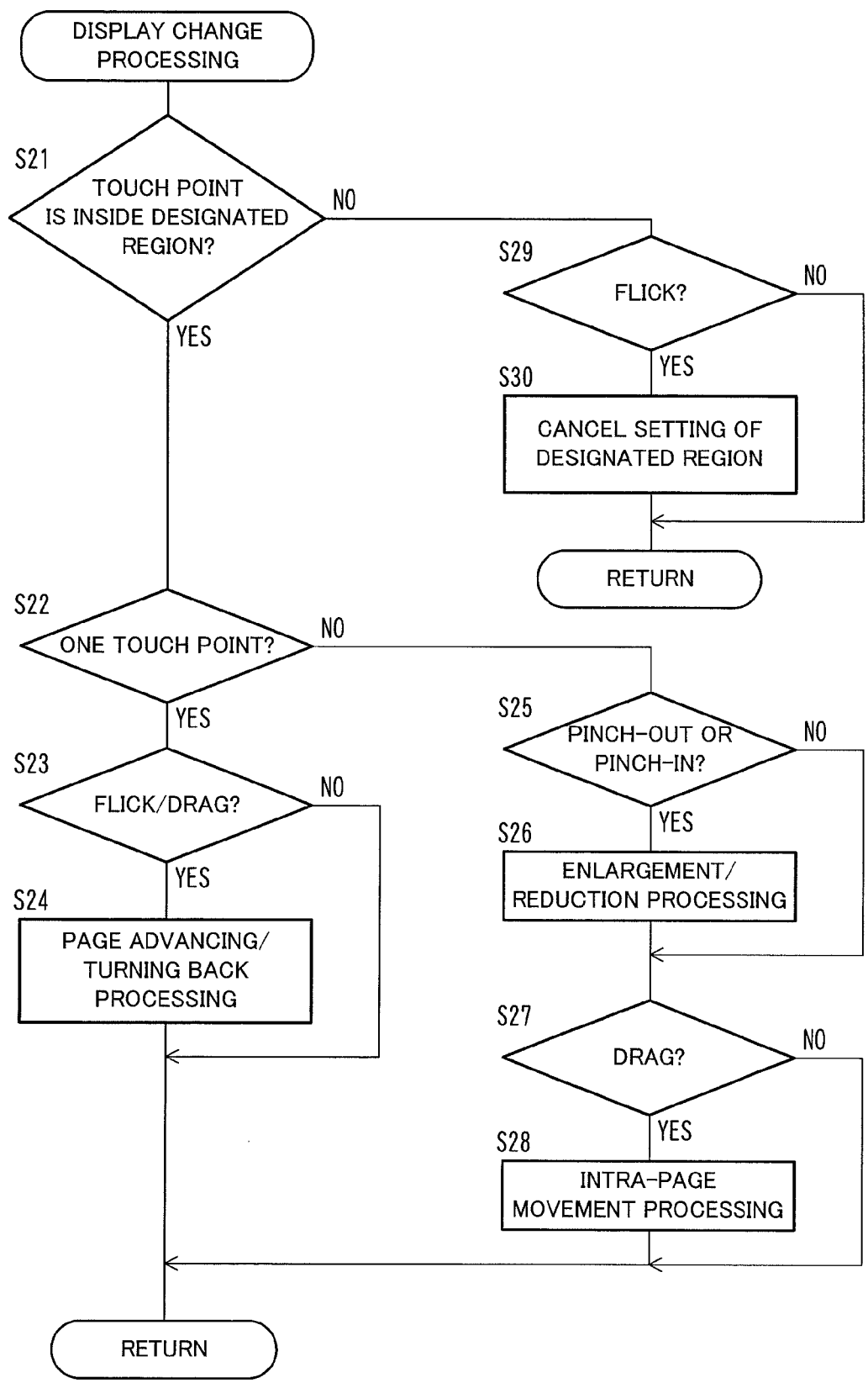
FIG. 17 is a flowchart depicting an example of a display change processing routine performed by a page image displaying device.

FIG. 17 is a flowchart depicting an example of the display change processing routine in Step S05 of FIG. 15. The display change processing routine is performed when at least one designated region is set and a touch action of touching a position in the page display region 82 is detected.

The operation input processing portion 201 determines whether or not a slide gesture starting from a position in the set designated region has been performed (Step S21). If the slide gesture starts with a touch point starting from the designated region and the touch point moves accordingly (Yes in Step S21), the operation input processing portion 201 then checks how many points were touched concurrently (Step S22). The display control portion 202 changes what is displayed in the page display region 82 depending on the check result.

If one touch point is found (Yes in Step S22), and if the touch action corresponds to flick or drag (Yes in Step S23), then the display control portion 202 advances/turns back page (Step S24). In the page advancing/turning back processing, the partial page switch shown in FIGS. 6 and 7 is performed.

If two touch points are found (No in Step S22), and if the touch action corresponds to pinch-out or pinch-in (Yes in Step S25), then the display control portion 202 performs enlargement/reduction processing (Step S26). In the enlargement/reduction processing, the enlarged display of a partial page image shown in FIG. 13 and the reduced display of a partial page image of reducing an image-to-be-switched corresponding to the designated region are performed in accordance with the pinching gesture.

If two touch points are found (No in Step S22), and if the touch action corresponds to drag (Yes in Step S27), then the display control portion 202 performs intra-page movement processing (Step S28). According to the intra-page movement processing, the moved display of a partial page image shown in FIG. 14 is performed.

On the other hand, if the check result in Step S21 is NO, in other words, if a position other than the designated region of the page display region 82 is touched, then the operation input processing portion 201 checks whether or not a flick gesture has been made (Step S29). If it is found that the flick gesture is made (Yes in Step S29), then the region setting portion 203 cancels the setting of designated region (Step S30). This removes the boundary between a designated region and the other region in the page display region 82. The whole page image of a page corresponding to an image-not-to-be-switched is displayed in the page display region 82. In short, what is displayed in the page display region 82 returns to what was displayed therein before a designated region is set.

According to the foregoing embodiment, it is possible to implement, in displaying a document having a plurality of pages, page switched display by which a part of a page is switched to a part of another page for display.

In the foregoing embodiment, the touch action is not limited to a touch action with user's finger on the touch screen. The touch action may be one with a stylus. It is always not necessary that the touch action is physically touching onto the touch screen. A touch-sensitive panel may be used which detects, as the touch action, approach to the panel with finger or stylus. A gesture of moving finger or stylus on the touch screen without losing contact therefrom is detected as flick, drag, or swipe.

For setting of a designated region, when a track of finger/stylus via a slide gesture has a linear shape such as a curve or a meander, in the page display region 82, it is possible to approximate the track to a straight line at predetermined intervals, and to set, as the designated region, a polygon. Alternatively, it is possible to set, as the designated region, an indefinite shape whose contour corresponds to the track.

A page image display to which partial page switch is to be performed is not limited to an image displayed in the preview mode. For example, a personal computer user may display in a monitor a page image of a document saved in the personal computer in order to check or edit the content of the document. In this way, when a page image is displayed in order for a user to look at the current page image, partial page switch may be performed.

The partial page switch may be implemented in mobile information equipment such as a tablet computer or smartphone provided with a touch-sensitive panel, and a personal computer on which an operating system runs in response to touch actions on the screen.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image forming apparatus comprising:
   a display unit;
   a touch-sensitive panel that detects a touch action made on a screen of the display unit;
   a region setting portion that sets, in a state where the display unit displays a page image of a first page that is any one of pages constituting a document, when the touch-sensitive panel detects a first touch action of designating a part of a page display region in which the page image on the screen is displayed, the designated part as a designated region; and a display control portion that keeps displaying, when the designated region is set, and when the touch-sensitive panel detects a second touch action of giving a command to changes pages to be displayed from one to another, the page image of the first page in a region other than the designated region of the page display region, and, to change partly what is displayed in the page display region in a manner to display a part of a page image of a second page of the document in the designated region, said part corresponding to a part in position in the designated region of the page image of the first page, wherein the first touch action is an action of touching one point on the screen and then moving the point to cross over two positions on an edge of the page display region, and the region setting portion sets, as the designated region, one of two sections obtained by dividing the page display region with a track of the point regarded as a boundary.

2. The image forming apparatus according to claim 1, wherein the second touch action is an action of touching one point in the designated region and then moving the point.

3. A page image displaying device comprising:
a display unit;
a touch-sensitive panel that detects a touch action made on a screen of the display unit;
a region setting portion that sets, in a state where the display unit displays a page image of a first page that is any one of pages constituting a document, when the touch-sensitive panel detects a first touch action of designating a part of a page display region in which the page image on the screen is displayed, the designated part as a designated region; and
a display control portion that keeps displaying, when the designated region is set, and when the touch-sensitive panel detects a second touch action of giving a command to changes pages to be displayed from one to another, the page image of the first page in a region other than the designated region of the page display region, and, to change partly what is displayed in the page display region in a manner to display a part of a page image of a second page of the document in the designated region, said part corresponding to a part in position in the designated region of the page image of the first page, wherein
in a state where the designated region is set, the region setting portion cancels setting of the designated region when the touch-sensitive panel detects a third action of touching one point outside the designated region and then moving the point.

4. The page image displaying device according to claim 3, wherein
the touch-sensitive panel detects a multi-touch action of touching a plurality of points concurrently,
the first touch action is an action of touching two points on the screen to cross over two of four sides forming an edge of the page display region from one of the two sides to the other, and
the region setting portion sets, as the designated region, a part enclosed by tracks of the two points in the page display region and the two sides.

5. The page image displaying device according to claim 3, further comprising an image forming portion that prints the document.

6. The page image displaying device according to claim 5, wherein
the region setting portion sets, in a state where the display unit displays a print state, by the image forming portion, of a page image of the first page of the document in a preview mode, when the first touch action is detected, the designated part as a designated region, and
the display control portion keeps displaying, when the designated region is set, and when the second touch action is detected, the page image of the first page in a region other than the designated region of the page display region in the preview mode, and, to change partly what is displayed in the page display region in a manner to display a part of a page image of a second page of the document in the designated region, said part corresponding to a part in position in the designated region of the page image of the first page.

7. The page image displaying device according to claim 3, wherein the second touch action is an action of touching one point in the designated region and then moving the point.

8. A page image displaying device comprising:
a display unit;
a touch-sensitive panel that detects a touch action made on a screen of the display unit;
a region setting portion that sets, in a state where the display unit displays a page image of a first page that is any one of pages constituting a document, when the touch-sensitive panel detects a first touch action of designating a part of a page display region in which the page image on the screen is displayed, the designated part as a designated region; and
a display control portion that keeps displaying, when the designated region is set, and when the touch-sensitive panel detects a second touch action of giving a command to changes pages to be displayed from one to another, the page image of the first page in a region other than the designated region of the page display region, and, to change partly what is displayed in the page display region in a manner to display a part of a page image of a second page of the document in the designated region, said part corresponding to a part in position in the designated region of the page image of the first page, wherein
the first touch action is an action of touching one point in the page display region and then moving the point in the page display region in such a manner that a track of the point has a linear shape to form a circle and cross the track itself, and
the region setting portion sets, as the designated region, a part enclosed by the track in the page display region.

9. The page image displaying device according to claim 8, wherein the second touch action is an action of touching one point in the designated region and then moving the point.

10. A display processing method comprising:
setting, in a state where a display unit displays a page image of a first page that is any one of pages constituting a document, when a touch-sensitive panel detects a first touch action of designating a part of a page display region in which the page image on a screen of the display unit is displayed, the designated part as a designated region; and
keep displaying, when the designated region is set, and when the touch-sensitive panel detects a second touch action of giving a command to change pages to be displayed from one to another, the page image of the first page in a region other than the designated region of the page display region, and, to change partly what is displayed in the page display region in a manner to display a part of a page image of a second page of the document in the designated region, said part corresponding to a part in position in the designated region of the page image of the first page, wherein the first touch action is an action of touching one point on the screen and then moving the point to cross over two positions on an edge of the page display region, and when the first touch action is detected, one of two sections obtained by dividing the page display region with a track of the point by the first touch action regarded as a boundary is set as the designated region.

11. The display processing method according to claim 10, wherein the second touch action is an action of touching one point in the designated region and then moving the point.

12. A display processing method comprising:

setting, in a state where a display unit displays a page image of a first page that is any one of pages constituting a document, when a touch-sensitive panel detects a first touch action of designating a part of a page display region in which the page image on a screen of the display unit is displayed, the designated part as a designated region; and keep displaying, when the designated region is set, and when the touch-sensitive panel detects a second touch action of giving a command to change pages to be displayed from one to another, the page image of the first page in a region other than the designated region of the page display region, and, to change partly what is displayed in the page display region in a manner to display a part of a page image of a second page of the document in the designated region, said part corresponding to a part in position in the designated region of the page image of the first page, wherein in a state where the designated region is set, setting of the designated region is cancelled when the touch-sensitive panel detects a third action of touching one point outside the designated region and then moving the point.

13. The display processing method according to claim 12, wherein the first touch action is an action of touching two points on the screen to cross over two of four sides forming an edge of the page display region from one of the two sides to the other, and when the first touch action is detected, a part enclosed by tracks of the two points in the page display region and the two sides is set as the designated region.

14. The display processing method according to claim 12, wherein the display unit is attached to an image forming apparatus that prints the document.

15. The display processing method according to claim 14, comprising setting, in a state where the display unit displays a print state of a page image of the first page of the document in a preview mode, when the first touch action is detected, the designated part as a designated region, and keep displaying, when the designated region is set, and when the second touch action is detected, the page image of the first page in a region other than the designated region of the page display region in the preview mode, and, to change partly what is displayed in the page display region in a manner to display a part of a page image of a second page of the document in the designated region, said part corresponding to a part in position in the designated region of the page image of the first page.

16. The display processing method according to claim 12, wherein the second touch action is an action of touching one point in the designated region and then moving the point.

17. A display processing method comprising:

setting, in a state where a display unit displays a page image of a first page that is any one of pages constituting a document, when a touch-sensitive panel detects a first touch action of designating a part of a page display region in which the page image on a screen of the display unit is displayed, the designated part as a designated region; and keep displaying, when the designated region is set, and when the touch-sensitive panel detects a second touch action of giving a command to change pages to be displayed from one to another, the page image of the first page in a region other than the designated region of the page display region, and, to change partly what is displayed in the page display region in a manner to display a part of a page image of a second page of the document in the designated region, said part corresponding to a part in position in the designated region of the page image of the first page, wherein the first touch action is an action of touching one point in the page display region and then moving the point in the page display region in such a manner that a track of the point has a linear shape to form a circle and cross the track itself, and when the first touch action is detected, a part enclosed by the track in the page display region is set as the designated region.

18. The display processing method according to claim 17, wherein the second touch action is an action of touching one point in the designated region and then moving the point.

19. A non-transitory computer-readable storage medium storing thereon a computer program, the computer program causing a computer to perform processes comprising:

region setting processing of setting, in a state where a display unit displays a page image of a first page that is any one of pages constituting a document, when a touch-sensitive panel detects a first touch action of designating a part of a page display region in which the page image on a screen of the display unit is displayed, the designated part as a designated region; and display control processing of keep displaying, when the designated region is set, and when the touch-sensitive panel detects a second touch action of giving a command to change pages to be displayed from one to another, the page image of the first page in a region other than the designated region of the page display region, and, to change partly what is displayed in the page display region in a manner to display a part of a page image of a second page of the document in the designated region, said part corresponding to a part in position in the designated region of the page image of the first page, wherein in a state where the first touch action is defined to touch one point on the screen and then move the point to cross over two positions on an edge of the page display region, when the first touch action is detected, the region setting processing includes setting, as the designated region, one of two sections obtained by dividing the page display region with a track of the point by the first touch action regarded as a boundary.

20. The non-transitory computer-readable storage medium according to claim 19, wherein the second touch action is an action of touching one point in the designated region and then moving the point.

21. A non-transitory computer-readable storage medium storing thereon a computer program, the computer program causing a computer to perform processes comprising:

region setting processing of setting, in a state where a display unit displays a page image of a first page that is any one of pages constituting a document, when a touch-sensitive panel detects a first touch action of designating a part of a page display region in which the page image on a screen of the display unit is displayed, the designated part as a designated region; and display control processing of keep displaying, when the designated region is set, and when the touch-sensitive panel detects a second touch action of giving a command to change pages to be displayed from one to another, the page image of the first page in a region other than the designated region of the page display region, and, to change partly what is displayed in the page display region in a manner to display a part of a page image of a second page of the document in the designated region, said part corresponding to a part in position in the designated region of the page image of the first page, wherein under a state where the designated region is set, the region setting processing includes canceling setting of the designated region when the touch-sensitive panel detects a third action of touching one point outside the designated region and then moving the point.

22. The non-transitory computer-readable storage medium according to claim 21, wherein, when the first touch action is defined to touch two points on the screen to cross over two of four sides forming an edge of the page display region from one of the two sides to the other, and when the first touch action is detected, the region setting processing includes, as the designated region, setting a part enclosed by tracks of the two points in the page display region and the two sides.

23. The non-transitory computer-readable storage medium according to claim 21, wherein the non-transitory computer-readable storage medium is attached to an image forming apparatus that prints the document.

24. The non-transitory computer-readable storage medium according to claim 23, wherein the region setting processing includes setting, in a state where the display unit displays a print state, by the image forming apparatus, of a page image of the first page of the document in a preview mode, when the first touch action is detected, the designated part as a designated region, and the display control processing includes keeping displaying, when the designated region is set, and when the second touch action is detected, the page image of the first page in a region other than the designated region of the page display region in the preview mode, and, changing partly what is displayed in the page display region in a manner to display a part of a page image of a second page of the document in the designated region, said part corresponding to a part in position in the designated region of the page image of the first page.

25. The non-transitory computer-readable storage medium according to claim 21, wherein the second touch action is an action of touching one point in the designated region and then moving the point.

26. A non-transitory computer-readable storage medium storing thereon a computer program, the computer program causing a computer to perform processes comprising:

region setting processing of setting, in a state where a display unit displays a page image of a first page that is any one of pages constituting a document, when a touch-sensitive panel detects a first touch action of designating a part of a page display region in which the page image on a screen of display unit is displayed, the designated part as a designated region; and display control processing of keep displaying, when the designated region is set, and when the touch-sensitive panel detects a second touch action of giving a command to change pages to be displayed from one to another, the page image of the first page in a region other than the designated region of the page display region, and, to change partly what is displayed in the page display region in a ma er to display a part of a page image of a second page of the document in the designated region, said part corresponding to a part in position in the designated region of the page image of the first page, wherein when the first touch action is defined to touch one point in the page display region and then move the point in the page display region in such a manner that a track of the point has a linear shape to form a circle and cross the track itself, and when the first touch action is detected, the region setting processing includes setting, as the designated region, a part enclosed by the track in the page display region.

27. The non-transitory computer-readable storage medium according to claim 26, wherein the second touch action is an action of touching one point in the designated region and then moving the point.

* * * * *